United States Patent Office 3,424,073
Patented Jan. 28, 1969

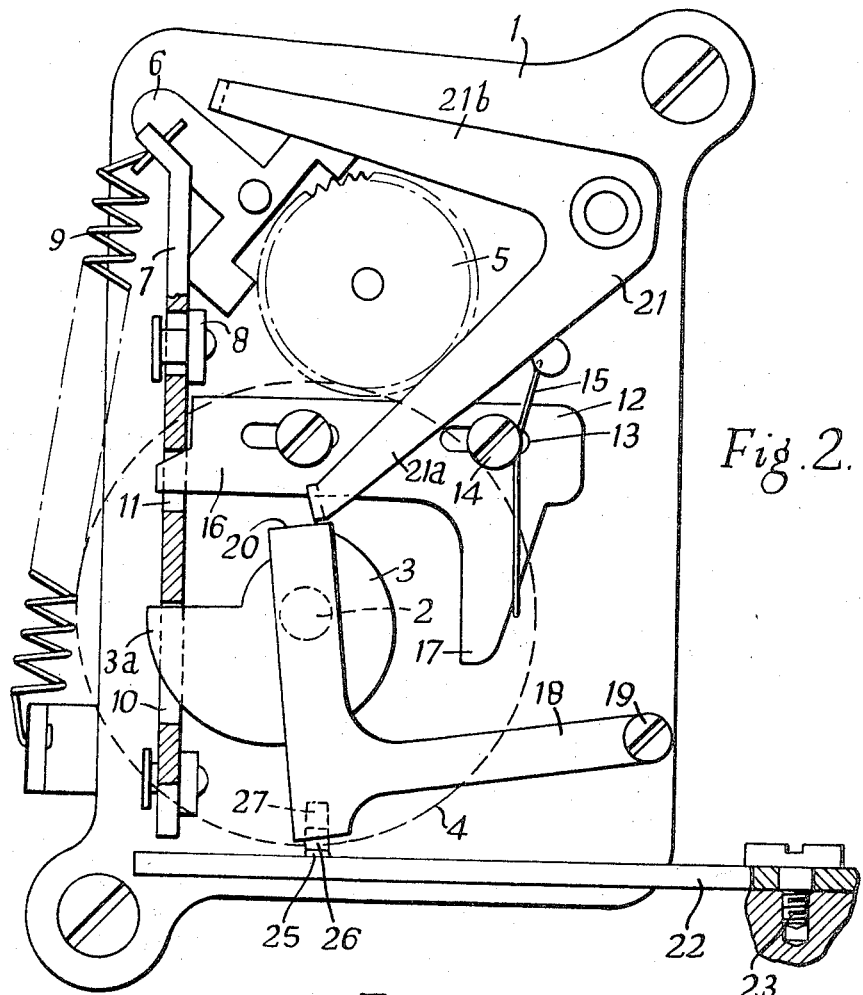
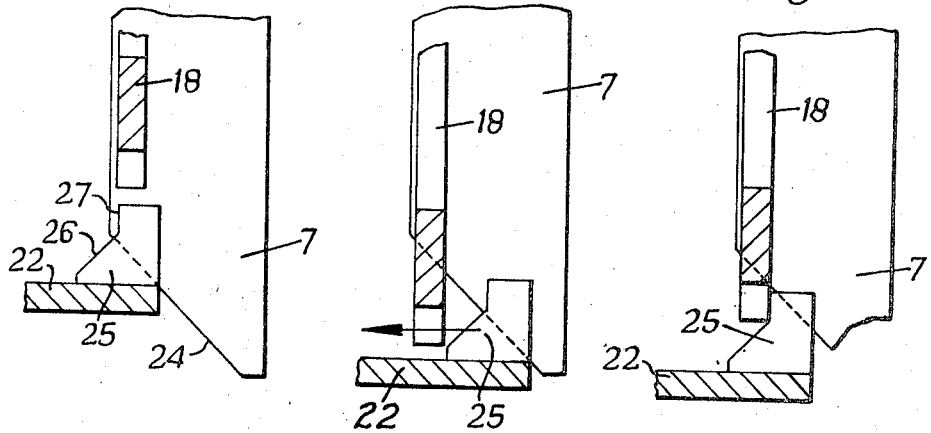

3,424,073
CAMERA PRETIMER MECHANISM
Günter Hausmann, Dresden, Germany, assignor to VEB Pentacon Dresden Kamera- und Kinowerke, Dresden, Germany
Filed Feb. 11, 1966, Ser. No. 526,873
U.S. Cl. 95—53.3     5 Claims
Int. Cl. G03b 9/64

ABSTRACT OF THE DISCLOSURE

A pretimer is provided which by the utilization of two springs, only one of which operates against the escapement, supplies relatively high release pressure without necessitating increased weight or size of the escapement.

---

The present invention relates to a pretimer mechanism, especially in combination with mirror-reflex cameras with pressure release diaphragm.

Pretimer mechanisms are known which comprise a release slider controlled by the escapement, which initiates the exposure operation after the running off of the pretimer mechanism, in that this slider acts upon the release arrangement of the camera. The drive spring of the pretimer escapement serves as force source for the operation of this release slider. Since the release operation takes place shortly before this spring has run off, and at this moment the spring is greatly relaxed, only relatively slight forces are available for the release operation. In simple cameras such pretimer mechanisms can quite well be used, since only slight forces are necessary for the release operation. However in the case of cameras where a plurality of functions must be carried out at the same time in the initiation of the exposure operation, as for example in mirror reflex cameras having a pressure release diaphragm, where the diaphragm is set to a preselected value by the release pressure in the release operation, relatively high release pressures are necessary.

Per se it would in fact be possible to increase the size of the drive spring of the escapement with the purpose of obtaining a greater release force. This however necessarily involves a shortening of the pretimer time, which again would have to be compensated by extension of the gear train between drive spring and escape wheel. Thus in every case a considerable increase of dimensions of the pretimer mechanism occurs, which mechanism ordinarily represents a component of the camera and must be housed in the space which in any case is mostly constricted.

Now it is the problem of the present invention to provide a pretimer mechanism which can supply relatively high release pressures, while the size of the escapement—especially of the force store of the escapement—is to remain within the usual dimensions.

According to the invention there is provided a pretimer mechanism for cameras having a pressure release shutter mechanism mounted within the housing including (a) a support for mounting within the camera housing,
(b) a release slider movable between a rest position and a cocked position and serving to initiate operation of the shutter mechanism,
(c) a spring connected between the support member and the release slider for urging the latter towards its rest position,
(d) an escapement mechanism having an escapement wheel mounted on the support member, an escapement mounted on the support member and engageable with the wheel to control the speed of the latter, and an escapement spring arranged to drive the escapement wheel,
(e) means for tensioning said escapement spring,
(f) means for moving the release slider to its cocked position against the action of its spring simultaneously with the tensioning of said escapement spring,
(g) means for holding said escapement mechanism in a tensioned condition, and
(h) means for holding said release slider in its cocked position and for effecting release of said escapement mechanism and subsequently of said slider in dependence upon the running down of the escapement wheel.

Due to such a style of arrangement the entire release pressure is supplied by the additional spring, while the force store for the escapement has essentially to supply only the forces necessary for the running off of the escapement, and no additional operating handle becomes necessary here for the cocking of the additional spring.

An especially expedient form of embodiment of the invention provides that with the winding shaft of the pretimer mechanism there is firmly connected a control cam to which a plurality of control functions are allocated, in that on the one hand the control cam, engaging in a piercing situated on the release slider, transfers the latter into the cocked position, and on the other hand at the end of the running off path of the pretimer mechanism the control cam controls a spring-loaded blocking slider holding the release slider in the cocked position and a pivotably mounted intermediate lever, which is arranged between a release lever acting on the release arrangement of the camera and a control lever which influences the escape lever of the escapement.

According to a further feature of the invention the release lever carries an attached piece which comprises an oblique surface controlling the intermediate lever and merging into a stop surface which, in combination with the intermediate lever, forms an intermediate stop for the release lever. This arrangement simply prevents the camera release from being able to be pressed in in the release of the pretimer mechanism.

The invention will be described in greater detail hereinafter with reference to an example of embodiment.

FIGURE 2 shows a plan view of the pretimer mechanism according to the invention, the pretimer mechanism being in the cocked condition;

FIGURE 3 shows a section along the line A—A in FIGURE 1;

FIGURE 4 shows a section along the line A—A in FIGURE 2;

FIGURE 5 shows a section along the line A—A in FIGURE 1, the pretimer mechanism being in the released condition however.

Figure 1:
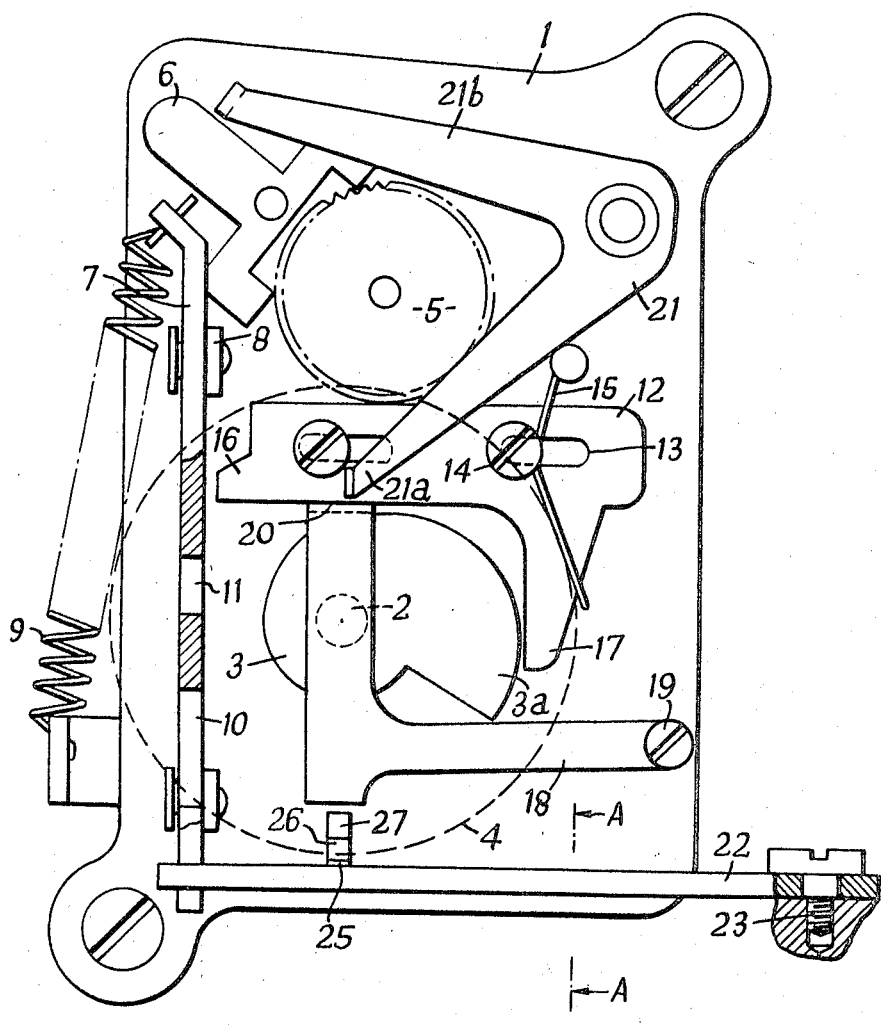
FIGURE 1 shows a plan view of the pretimer mechanism according to the invention, the pretimer mechanism being in the run-down condition.

All the parts of the pretimer mechanism are mounted on a plate 1. A control cam 3 is firmly connected with the winding shaft 2, which is connected in a manner known per se with the drive spring (not shown), for the pretimer mechanism. The spring housing 4, represented in chain lines, is in gear connection in known manner through a gear train (not shown) with the escape wheel 5, the running off of which is controlled by the escape lever 6. A release slider 7 is mounted in a guide 8. A tension spring 9 is attached on the one hand to the upper end of the release slider 7 and on the other to the plate 1. The release slider has two openings 10 and 11. A blocking slider 12 is displaceably mounted on the plate 1 by means of slots 13 and screws 14 and is influenced by a compression spring 15. The blocking slider 12 has a nose 16 lying opposite to the release slider 7, which nose co-operates in a manner to be described hereinafter with the upper piercing 11 of the release slider 7, also a nose 17 lying in the range of action of the control cam 3. An intermediate lever 18 is mounted for pivoting about the pivot point 19 on the frame. It comprises a cranked portion 20, the upper surface of which co-operates with an arm 21a of a bell-crank lever 21 mounted on the frame and the lower surface of which co-operates with the control cam 3. The other arm 21b of the bell-crank lever 21 can be brought into the range of action of the escape lever 6.

A release lever 22, in connection with the camera release arrangement in a manner not illustrated further, is mounted for pivoting about a bolt 23 mounted on the camera. The end of the release lever towards the pretimer mechanism co-operates with an oblique face 24 provided on the lower end of the release slider 7. Moreover the release lever 22 carries an attached piece 25, which has an oblique surface 26 which merges into a stop surface 27. The cooperation of these two surfaces with the intermediate lever 18 will be described further below.

The manner of operation of the device is as follows:

Cocking operation

When the pretimer mechanism is in the run-down condition its parts are in the position as illustrated in FIGURES 1 and 3. On rotation of the winding shaft 2 with the aid of a handle (not shown) in the clockwise direction the drive spring for the escape wheel 5 is tensioned. Moreover in the cocking operation the point 3a of the control cam 3 engages in the opening 10 situated on the release slider 7 and in the course of the further cocking movement urges the release slider 7 upwards, the tension spring 9 being tensioned. When the upper opening 11 of the release slider 7 has arrived at the level of the nose 16 of the blocking slider 12, the latter enters this piercing under the action of the compression spring 15 and detains the release slider 7.

In the cocked condition now the parts of the pretimer mechanism are in the position as illustrated in FIGURES 2 and 4.

Release operation

By operation of the release arrangement on the camera the release lever 22 is pivoted in the direction of the arrow (see FIGURE 4). With the aid of the oblique surface 26 situated on the attached piece 25, the intermediate lever 18 is here lifted, in turn lifting the bell-crank lever 21 by means of the upper face of its cranked portion 20, whereby the arm 21b of the bell-crank lever comes out of the range of action of the escape lever 6, so that the pretimer mechanism can run off. Pressing in of the release arrangement is prevented by the stop surface 27 situated on the attached piece 25, which stop surface places itself against the intermediate lever 18 (see FIGURE 5).

The control cam 3 rotates in the counterclockwise direction in the now ensuing running off of the pretimer mechanism, and in the last running off phase draws the control slider 12, out of the opening 11 of the release slider 7. In this running-off phase at the same time the intermediate lever 18 is lifted by the control cam 3 by means of the lower surface of the cranked portion 20 by a further distance, so that the lower part of the intermediate lever 18 comes out of the region of the stop surface 27 and thus the release lever 22 is pivoted further by the release slider 7, drawn downwards by the tension spring 9, by means of its oblique surface 24 by such an amount that the release of the camera shutter or the initiation of the functions otherwise necessary for the exposure can take place.

I claim:

1. A pretimer mechanism for cameras having a pressure release shutter mechanism mounted within the camera housing including:
   (a) a support member for mounting within the camera housing,
   (b) a release slider movable between a rest position and a cocked position and serving to initiate operation of the shutter mechanism,
   (c) a spring connected between the support member and the release slider for urging the latter towards its rest position,
   (d) an escapement mechanism having an escapement wheel mounted on the support member, an escapement mounted on the support member and engageable with the wheel to control the speed of the latter, and, an escapement spring arranged to drive the escapement wheel,
   (e) means for tensioning said escapement spring,
   (f) means for moving the release slider to its cocked position against the action of its spring simultaneously with the tensioning of said escapement spring,
   (g) means for holding said escapement mechanism in a tensioned condition, and
   (h) means for holding said release slider in its cocked position and for effecting release of said escapement mechanism and subsequently of said slider is dependence upon the running down of the escapement wheel.

2. A pretimer mechanism according to claim 1, wherein said means for holding said release slider in its cocked position is in the form of a spring-urged blocking slider; said means for tensioning the escapement spring includes a winding shaft to which one end of said escapement spring is attached; said means for moving the release slider is a cam connected to said shaft so as to rotate therewith between a cocked position in which the escapement spring is tensioned and a rest position where the cam and shaft have run off; said cam being shaped with a portion which is engageable in an opening in said release slider so as to effect cocking of the latter and being engageable with said blocking slider to move the latter out of engagement with the release slider as the cam reaches its rest position after running off.

3. A pretimer according to claim 2, wherein said means for holding the escapement mechanism in a tensioned condition includes a bell-crank lever pivoted on said support member, one arm of which is engageable with said escapement, the provision of a release lever connectible with the camera release, and an intermediate lever also pivoted on the support member and engageable with the other arm of said bell circuit lever said intermediate lever being movable by said release lever on actuation of the camera release to pivot said bell-crank lever out of engagement with the escapement.

4. A pretimer according to claim 3, wherein a projection is provided on the release lever which projection is shaped with an oblique surface which engages and moves the intermediate lever and with a stop surface which is continuous with said oblique surface and serves as an intermediate stop for the release lever.

5. A pretimer according to claim 4, wherein said intermediate lever is provided with a bent-over portion engageable by said cam to cause movement of the intermediate lever into a position which engages the bell-crank lever with the escapement when the cam is in its cocked position.

References Cited

UNITED STATES PATENTS 3,187,653   6/1965   Rentschler _____ 95—53.3 X

JOHN M. HORAN, *Primary Examiner.*